United States Patent
Montiel et al.

(10) Patent No.: US 10,514,104 B2
(45) Date of Patent: Dec. 24, 2019

(54) INDEXER CONTROLLED DIRECTIONAL VALVE SYSTEM

(71) Applicant: Schlumberger Technology Corporation, Sugar Land, TX (US)

(72) Inventors: Edgar Jose Montiel, Richmond, TX (US); Abbigail Ullrich, Houston, TX (US); Mark Smith, Alvin, TX (US); Michael Fuad, Houston, TX (US); Colin Arthur Longfield, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 57 days.

(21) Appl. No.: 15/253,222

(22) Filed: Aug. 31, 2016

(65) Prior Publication Data

US 2017/0059045 A1    Mar. 2, 2017

Related U.S. Application Data

(60) Provisional application No. 62/212,101, filed on Aug. 31, 2015.

(51) Int. Cl.
*E21B 34/08* (2006.01)
*F16K 11/07* (2006.01)
*F16K 31/528* (2006.01)

(52) U.S. Cl.
CPC .......... *F16K 11/07* (2013.01); *F16K 31/5286* (2013.01)

(58) Field of Classification Search
CPC ...................................................... E21B 34/08
See application file for complete search history.

(56) References Cited

U.S. PATENT DOCUMENTS

| | | | | |
|---|---|---|---|---|
| 6,179,052 | B1* | 1/2001 | Purkis | E21B 23/04 166/319 |
| 2014/0124195 | A1* | 5/2014 | Tahoun | E21B 21/103 166/250.01 |
| 2016/0024850 | A1* | 1/2016 | Ringgenberg | E21B 23/006 175/57 |
| 2016/0194917 | A1* | 7/2016 | Alali | E21B 7/24 175/322 |
| 2017/0254195 | A1* | 9/2017 | Knight | E21B 47/122 |

* cited by examiner

*Primary Examiner* — Giovanna C Wright
*Assistant Examiner* — Yanick A Akaragwe
(74) *Attorney, Agent, or Firm* — Cameron R. Sneddon

(57) ABSTRACT

A technique enables mechanical control of a directional valve. The technique may utilize a system comprising a directional valve which is mechanically actuatable between a plurality of flow positions. The directional valve is mechanically coupled with an indexer mechanism. The indexer mechanism may be shifted to a plurality of desired indexer positions defined by a cam track. As the indexer mechanism is shifted between indexer positions, the mechanical link between the indexer mechanism and the directional valve mechanically shifts the directional valve to selected flow positions of the plurality of flow positions.

17 Claims, 2 Drawing Sheets

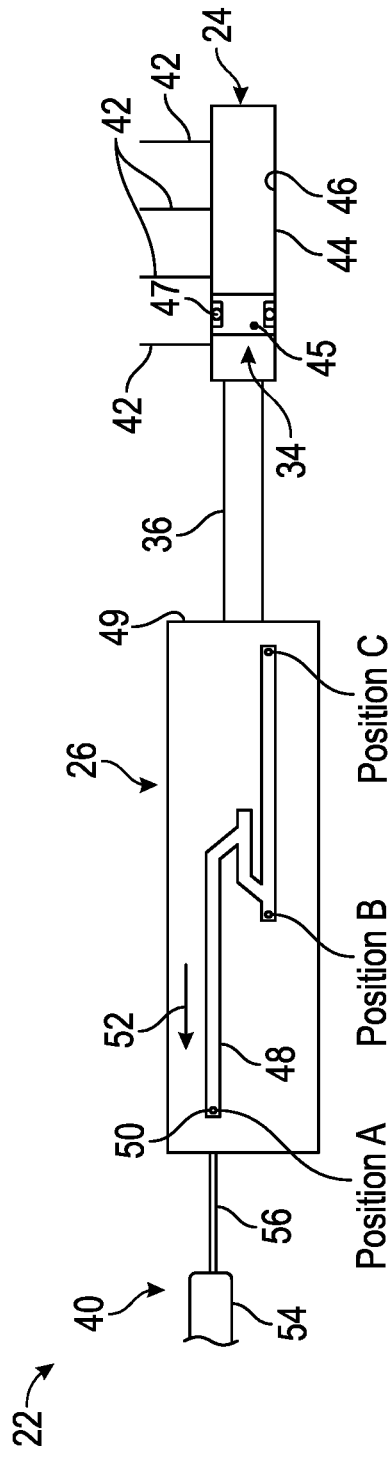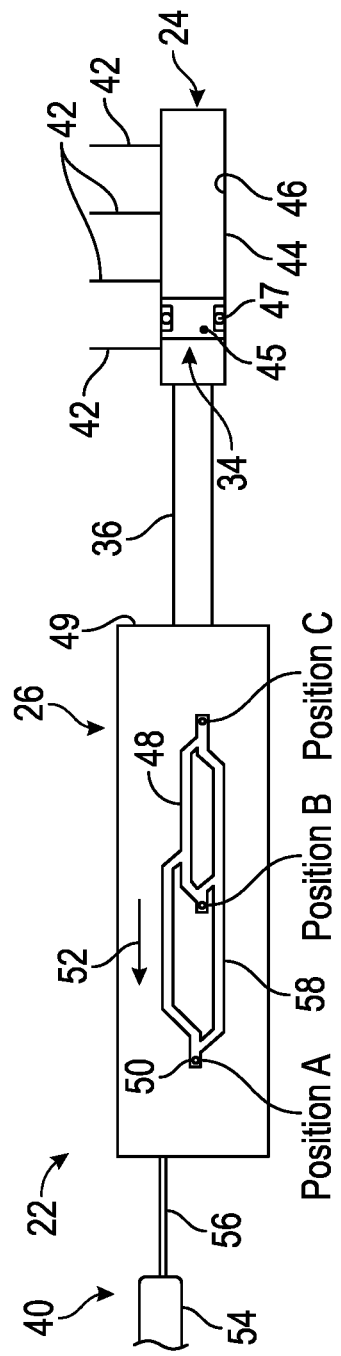
FIG. 4
FIG. 5

INDEXER CONTROLLED DIRECTIONAL VALVE SYSTEM

BACKGROUND

Valves are employed in a variety of applications to control flow of a fluid. Depending on the valve configuration, the valve may be actuated between two or more positions which correspond with two or more flow configurations. Generally, the valve is coupled with an actuation system, e.g. an electronic or hydraulic actuation system, which may be selectively operated to shift the valve between the flow configurations. The valve is shifted between positions by, for example, moving a valve element contained within the valve.

SUMMARY

In general, a system and methodology are provided for improved control of a valve. According to an embodiment, the system comprises a directional valve which is mechanically actuatable between a plurality of flow positions. The directional valve is mechanically coupled with an indexer mechanism. The indexer mechanism may be shifted by moving an indexing mandrel with respect to a cam constrained by a cam track in the indexing mandrel. As the indexer mechanism is shifted between positions, the mechanical link between the indexer mechanism and the directional valve mechanically shifts the directional valve to selected flow positions of the plurality of flow positions.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 4 is a schematic illustration of an example of a directional valve in the form of a spool valve mechanically linked with an indexer mechanism via an actuator member, according to an embodiment of the disclosure; and FIG. 5 is a schematic illustration of another example of a directional valve in the form of a spool valve mechanically linked with an indexer mechanism via an actuator member, according to an embodiment of the disclosure.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally relates to an index method for controlling valve position. An indexer mechanism is used in combination with a mechanically actuated valve to control, e.g. restrict, movement of a valve element such as a valve spool cylinder. By way of example, the valve may be in the form of a directional valve and the combination of directional valve and indexer mechanism provides an operator with precise control of the directional valve. The movement or path of the indexer is selected according to the sequence of operations for a given valve application. In embodiments described herein, a mechanically actuated directional valve is combined with a hydraulically controlled indexer activism.

According to an example, a system and methodology are provided for controlling a valve. In this example, the system comprises a directional valve which is mechanically actuatable between a plurality of fluid flow positions. The directional valve is mechanically coupled with an indexer mechanism. The indexer mechanism may be shifted by moving an indexing mandrel with respect to a cam disposed in a cam track of the indexing mandrel. As the indexer mechanism is shifted between positions, the mechanical link between the indexer mechanism and the directional valve mechanically shifts the directional valve to selected flow positions of the plurality of flow positions. In some applications, the indexer mechanism enables precise mechanical control over the directional valve so as to control flow of fluid along specific hydraulic lines. However, the mechanical linkage and precise control may be utilized in various other valve applications.

Figure 1:
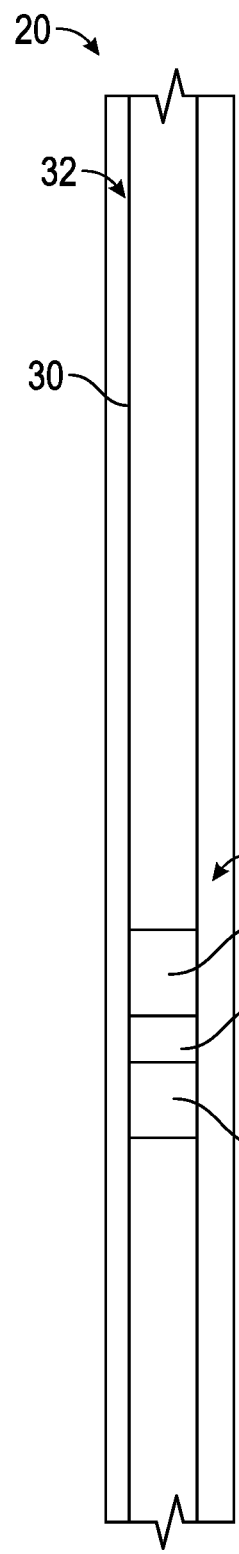
FIG. 1 is a schematic illustration of an example of a mechanical valve control system having a mechanically actuated valve coupled with an indexer mechanism and deployed in a wellbore, according to an embodiment of the disclosure.

Referring generally to FIG. 1, an example of a well system 20 is illustrated utilizing a mechanical valve control system 22 having a combined valve 24 and indexer mechanism 26. In this embodiment, the valve 24 is mechanically controllable by indexer mechanism 26 to enable precise control of flow configurations. For example, the valve 24 may be shifted between different fluid flow positions to control the flow of actuating fluid to a hydraulically controlled well tool 28. However, valve 24 may be used to control a variety of other fluid flows. In the embodiment of FIG. 1, the valve 24 and the indexer mechanism 26 are positioned in a well string 30 deployed in a wellbore 32. However, the valve 24 and the indexer mechanism 26 may be utilized in other applications, including non-well applications, to provide precise control over fluid flows.

Figure 2:
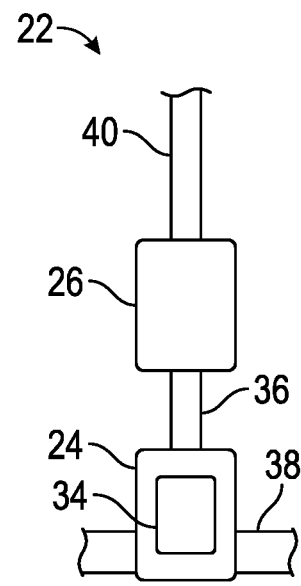
FIG. 2 is a schematic illustration of an example of a directional valve mechanically linked with an indexer mechanism, according to an embodiment of the disclosure.

Referring generally to FIG. 2, an embodiment of mechanical valve control system 22 is illustrated. In this example, the valve 24 comprises a movable element 34, such as a sleeve, which may be shifted between flow positions by a mechanical actuator member 36 coupled between valve 24 and indexer mechanism 26. By way of example, the movable element/sleeve 34 may be shifted to a plurality of flow positions to provide precise control of fluid along, for example, a conduit 38. The flow positions of valve 24 correspond with indexer positions of indexer mechanism 26, and indexer mechanism 26 may be controlled via a control system 40. By way of example, the control system 40 comprises a hydraulic control system for selectively positioning the indexer mechanism 26 at the desired indexer positions. However, in some applications control system 40 may comprise a mechanical control system or another suitable control system.

Figure 3:
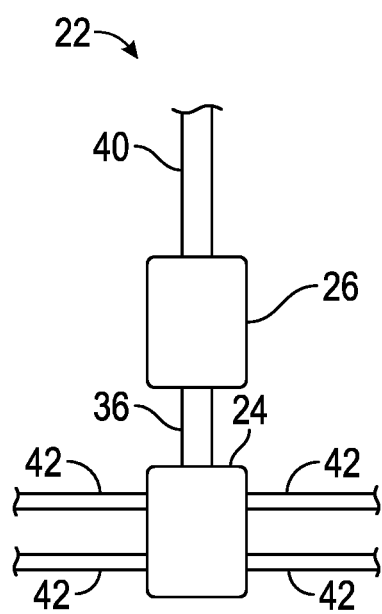
FIG. 3 is a schematic illustration of another example of a directional valve mechanically linked with an indexer mechanism, according to an embodiment of the disclosure.

Referring generally to FIG. 3, another embodiment of mechanical valve control system 22 is illustrated. In this example, the valve 24 comprises another example of a directional valve which may be shifted between flow positions by mechanical actuator member 36. The valve 24 may comprise a variety of movable elements 34, e.g. sliding sleeve, spool, or other suitable element, which may be shifted to a selected flow position of a plurality of flow positions, thus providing precise control of fluid flow. For example, the valve 24 may be shifted to precisely control the flow of fluid between selected hydraulic lines 42. The fluid flow positions of valve 24 again correspond with indexer positions of indexer mechanism 26.

Referring generally to FIG. 4, another embodiment of mechanical valve control system 22 is illustrated. In this example, directional valve 24 is in the form of a spool valve 44 having a spool 45, e.g. a spool cylinder, slidably disposed in a corresponding valve housing 46 and sealed with respect to an interior surface of the valve housing 46 via a seal or seals 47. The spool 45 may be mechanically shifted to selected fluid flow positions of a plurality of flow positions. In the specific example illustrated, the spool 45 may be selectively shifted to desired flow positions, e.g. flow positions A, B or C, for controlling fluid flow through specific hydraulic lines 42. In the embodiment of FIG. 4, the valve 24 is used to control fluid flow through four hydraulic lines 42 although different numbers of hydraulic lines 42 and different numbers of flow positions may be utilized depending on the parameters of a given application.

The indexer mechanism 26 is coupled to the directional valve 24 and specifically to the spool 45 via mechanical actuator member 36. In this example, the indexer mechanism 26 has a plurality of indexer positions, e.g. indexer positions A, B or C, which correspond to the flow positions of valve 24. The indexer mechanism 26 comprises a cam track 48 formed in an indexing mandrel 49 which cooperates with a cam 50 to establish the various indexer positions. By way of example, the indexing mandrel 49 may be connected with actuator member 36 and may be selectively moved with respect to cam 50 according to the cam track 48. For example, indexing mandrel 49 may be coupled with control system 40 which forces indexing mandrel 49 to move with respect to cam 50 which is constrained to cam track 48. The indexing mandrel 49 may be moved against a spring/spring resistance represented by arrow 52. The control system 40 and the spring/spring resistance 52 cooperate to cycle the indexing mandrel 49 and indexer mechanism 26 to the sequential indexer positions, e.g. indexer positions A, B and C, along cam track 48. This in turn cycles the valve 24 between its corresponding fluid flow positions, e.g. flow positions A, B and C, via actuator member 36. In the example illustrated in FIG. 4, the control system 40 comprises a hydraulic system having, for example, a hydraulic cylinder 54 which drives a cylinder piston member 56 coupled with indexing mandrel 49.

In FIG. 5, another embodiment of mechanical valve control system 22 is illustrated. In this embodiment, directional valve 24 may again comprise spool valve 44 however other types of valves may be coupled with mechanical actuator member 36. In this latter example, the cam track 48 comprises a reset track portion 58 which enables resetting of the indexer mechanism 26 to an initial position, e.g. indexer position A. The arrangement of cam track 48 allows the indexing mandrel 49 to be cycled through the sequential indexer positions of indexer mechanism 26. However, the reset track portion 58 is oriented such that release of indexing mandrel 49 via control system 40 allows the spring/spring bias 52 to force the indexing mandrel 49 to move with respect to cam 50 as guided by reset track portion 58 back to the initial indexer position. This allows the indexer mechanism 26 to be repeatedly cycled through the plurality of indexer positions. Consequently, the valve 24 may be repeatedly cycled through the plurality of fluid flow positions.

Although the directional valve 24 is illustrated in FIGS. 4 and 5 as having three fluid flow positions, the valve 24 may be constructed to have two fluid flow positions or more than three fluid flow positions. Similarly, the indexer mechanism 26 is illustrated as having three indexer positions, but the indexer mechanism 26 also may be constructed with two indexer positions or more than three indexer positions. In many applications, the number of indexer positions matches the number of fluid flow positions so that actuation of the indexer mechanism 26 between the indexer positions mechanically shifts the valve 24 between the same number of corresponding fluid flow positions. By controlling the cycling of indexer mechanism 26, the mechanical actuator member 36 may be used to mechanically shift the valve 24 to specific flow positions. In the specific example illustrated, valve 24 is a mechanically actuated directional valve which is mechanically controlled by indexer mechanism 26 which, in turn, is hydraulically controlled via hydraulic control system 40. This type of system enables precise and repeatable actuation of directional valve 24 in a variety of applications and environments.

With respect to operation of the embodiments illustrated in FIGS. 4 and 5, the directional valve 24 is mechanically actuated by the indexer mechanism 26 and cooperating actuator member 36. The indexer mechanism 26 is hydraulically controlled by hydraulic control system 40 and may be operated via pressure manipulation applied to hydraulic control system 40, e.g. pressure inputs applied to hydraulic cylinder 54 and piston member 56.

When the indexer mechanism 26 is in indexer position A, the spool 45 of valve 24 is in fluid flow position A, thus allowing communication between the three hydraulic lines 42 on the right side of valve 24. When the indexer mechanism 26 is shifted to indexer position B, the spool 45 is shifted to corresponding flow position B and the two hydraulic lines 42 on the left are placed in communication. Similarly, the two hydraulic lines 42 on the right are placed in communication, but the two hydraulic lines on the left are sealed off from the two hydraulic lines 42 on the right. To place the three hydraulic lines 42 on the left side of valve 24 into communication, the indexer mechanism 26 and the directional valve 24 are shifted to the indexer position C and the fluid flow position C, respectively. Depending on the configuration of directional valve 24 and indexer mechanism 26, as well as the number of hydraulic lines 42, the flow configurations may vary. For example, the configurations of cam track 48, spool 45, and hydraulic lines 42 may be adjusted to enable selection of a variety of fluid flow patterns between the various hydraulic lines 42.

The mechanical valve control system 22 may be used in many types of well strings 30 and in a variety of downhole environments. However, the mechanical valve control system 22 also may be used to control flow in other types of applications, including non-well applications and/or surface applications. Depending on the parameters of a given application, the size and configuration of both the directional valve 24 and the indexer mechanism 26 may be adjusted. In many applications, for example, valve 24 may utilize a spool which is shifted between different operational flow positions, but other movable valve elements, e.g. sleeves, may be used in a variety of applications. Similarly, the structure and configuration of the indexer mechanism 26 and the cam track 48 may be adjusted according to the characteristics of a given application. The actuator member 36 mechanically linking valve 24 and indexer mechanism 26 also may be constructed in various shapes, sizes, and/or configurations to accommodate the mechanical actuation of valves 24 in various applications.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for controlling flow, comprising:
   a directional valve which is mechanically actuatable between a plurality of flow positions;
   an actuator member mechanically coupled to the directional valve to mechanically shift the directional valve; and
   an indexer mechanism coupled to the actuator member, the indexer mechanism being hydraulically controlled to shift the actuator member, and thus the directional valve, to desired positions corresponding with select flow positions of the plurality of flow positions, wherein said indexer mechanism comprises a cam track having a first track and a reset track, said first track having a plurality of indexer positions, and said reset track portion is connected to each indexer position to enable resetting of the indexer mechanism to an initial indexer position from any of the sequential indexer positions.

2. The system as recited in claim 1, wherein the resetting of the indexer mechanism to an initial indexer position uses a spring bias.

3. The system as recited in claim 1, wherein the directional valve comprises a spool valve.

4. The system as recited in claim 1, wherein the directional valve controls flow of fluid between a plurality of hydraulic lines.

5. The system as recited in claim 1, wherein the directional valve controls flow of fluid between four hydraulic lines.

6. The system as recited in claim 1, wherein the indexer mechanism may be set to at least three indexer positions.

7. A well system, comprising:
   a well tool shiftable to a plurality of positions via hydraulic inputs;
   a directional valve which is mechanically actuated to control the hydraulic inputs applied to the well tool;
   a mechanical actuator member to shift the directional valve;
   an indexer mechanism coupled to the mechanical actuator member, said indexer mechanism comprises a cam track which establishes indexer positions, wherein the indexer mechanism further comprises a reset track portion connected to each indexer position to enable resetting of the indexer mechanism between an initial indexer position and any of the sequential indexer positions; and
   a hydraulic control system coupled to the indexer mechanism to enable selective shifting of the indexer mechanism to selected indexer positions.

8. The well system as recited in claim 7, wherein the well tool is positioned in a well string deployed in a wellbore.

9. The well system as recited in claim 7, wherein the indexer mechanism may be continually cycled through different indexer positions.

10. The well system as recited in claim 9, wherein the indexer mechanism may be continually cycled through different indexer positions using the cam track only, or both the reset track and the cam track.

11. The well system as recited in claim 7, wherein the indexer mechanism comprises a cam track which establishes at least three unique indexer positions.

12. The well system as recited in claim 7, wherein the directional valve comprises a spool shiftable to control flow of fluid between a plurality of hydraulic lines.

13. A method, comprising:
    mechanically coupling a directional valve to an indexer mechanism shiftable to positions defined by a cam track;
    shifting the directional valve to a plurality of valve positions by moving the indexer mechanism to desired, corresponding indexer positions as defined by the cam track; and
    controlling fluid flow by selecting specific valve positions of the plurality of valve positions; and,
    resetting said indexer mechanism to an original indexer position from any sequential indexer position by moving said indexer mechanism along a reset portion of said cam track.

14. The method as recited in claim 13, wherein mechanically coupling comprises connecting an actuator member between the directional valve and the indexer mechanism.

15. The method as recited in claim 13, further comprising coupling the directional valve and the indexer mechanism into a well string.

16. The method as recited in claim 15, wherein controlling fluid flow comprises controlling fluid flow in a wellbore.

17. The method as recited in claim 13, further comprising using a hydraulic system to actuate the indexer mechanism to desired indexer positions.

* * * * *